United States Patent [19]

Kleinschmit et al.

[11] Patent Number: 5,154,904
[45] Date of Patent: Oct. 13, 1992

[54] PROCESS FOR THE PRODUCTION OF A SEED MIXTURE FOR THE SYNTHESIS OF FAUJASITE

[75] Inventors: Peter Kleinschmit, Hanau; Gangolf Kriechbaum, Bruchköbel; Hans Strack, Alzenau, all of Fed. Rep. of Germany

[73] Assignee: Degussa Aktiengesellschaft, Fed. Rep. of Germany

[21] Appl. No.: 924,213

[22] Filed: Oct. 28, 1986

[30] Foreign Application Priority Data

Oct. 29, 1985 [DE] Fed. Rep. of Germany ...... 3538416

[51] Int. Cl.$^5$ .............................................. C01B 33/34
[52] U.S. Cl. .................................... 423/709; 423/710; 423/DIG. 21
[58] Field of Search ................ 502/79; 423/328, 329

[56] References Cited

U.S. PATENT DOCUMENTS

| | | | |
|---|---|---|---|
| 3,130,007 | 4/1964 | Breck | 423/329 |
| 3,433,589 | 3/1969 | Ciric et al. | 423/118 |
| 3,510,258 | 5/1970 | Hindin et al. | 423/329 |
| 3,574,538 | 4/1971 | McDaniel et al. | 423/329 |
| 4,175,059 | 11/1979 | Edwards et al. | 423/329 |
| 4,178,352 | 12/1979 | Vaughan et al. | 423/329 |
| 4,228,137 | 10/1980 | Taylor et al. | 423/328 |
| 4,608,236 | 8/1986 | Strack et al. | 502/79 |
| 4,631,262 | 12/1986 | Altomare | 423/329 |

FOREIGN PATENT DOCUMENTS

| | | | |
|---|---|---|---|
| 0483842 | 8/1975 | Australia | 502/79 |
| 1038016 | 9/1958 | Fed. Rep. of Germany . | |
| 1098929 | 2/1961 | Fed. Rep. of Germany . | |
| 1203239 | 10/1965 | Fed. Rep. of Germany . | |
| 2145800 | 3/1972 | Fed. Rep. of Germany . | |
| 2703264 | 8/1977 | Fed. Rep. of Germany | 423/328 |
| 3311229 | 10/1984 | Fed. Rep. of Germany . | |
| 0140314 | 8/1982 | Japan | 502/79 |

OTHER PUBLICATIONS

21 *Ullmanns Encyclopedia of Technical Chemistry* pp. 462–473 (Weinheim, West Germany 1982).
20 *Kirk-Othmar Encyclopedia of Chemical Technology* pp. 766–781 (New York 1982).

Primary Examiner—R. Bruce Breneman
Attorney, Agent, or Firm—Cushman, Darby & Cushman

[57] ABSTRACT

Precipitated silica is mixed with a solution of caustic soda, water and sodium aluminate to form a mixture of the composition:

12±3 $Na_2O:Al_2O_3$:12±3 $SiO_2$:200±60 $H_2O$. This mixture was aged for 18-72 hours.

2 Claims, No Drawings

PROCESS FOR THE PRODUCTION OF A SEED MIXTURE FOR THE SYNTHESIS OF FAUJASITE

BACKGROUND OF THE INVENTION

Faujasite is a synthetic sodium aluminosilicate having a three dimensional network of channels and hollow space. Because of its chemical composition and structure as well as temperature resistance and modifiability faujasite has extraordinary catalytic properties, which make possible its use for example in cracking catalysts.

In the employment in cracking catalysts X-ray graphic phase purity, degree of crystallinity, $SiO_2/Al_2O_3$ ratio and absorption properties play a central roll. (German AS 1203239, German patent 1098929, German patent 1038016).

It is known to produce seed mixtures for the synthesis of faujasite from water, alkali metal hydroxide, silica and aluminum oxide by mixing together sodium silicate and sodium aluminate (German patent 1930705, U.S. Pat. No. 4,228,137, U.S. Pat. No. 3,433,589).

The production of this seed mixture presupposes an exact dosage of the components. According to Example 1 of German patent 1930705 the ratio of the components is $Na_2O:Al_2O_3:SiO_2:H_2O = 15:1:15:165$. As a disadvantage slight deviations therefrom already lead to lack of crystallization. Besides this pumpable mixture occasionally gels to a compact mass which can only be converted again to the pumpable condition with loss of the seeding properties.

There are known from U.S. Pat. No. 4,228,137 seed mixtures of the composition $Na_2O:Al_2O_3:SiO_2:H_2O = 11:1:11.3:240$ which are produced from calcined clays. A disadvantage thereby is that only special types of clays possess seed properties after the calcination and, as natural products, are always subject to deviation in their chemical composition. Impurities with foreign ions can likewise act disadvantageously on the seed properties.

From German OS 2145800 there is known a process for the production of nuclei centers in which sodium aluminate liquor is present and sodium silicate solution is added. This mixture is aged for 24 hours at room temperature.

The known process has the disadvantage that because of the different contents of the aluminate liquor an increased analytical expense and dosing problems arise.

Dosing problems above all arise from the fact that for the establishment of a specific $SiO_2/Al_2O_3$ ratio with narrow tolerance limits there must be added a small amount of $Al_2O_3$ in the aluminate liquor to a large amount of sodium silicate in the solution.

From German patent 3311339 there is known a process for the production of a seed mixture for the faujasite synthesis in which amorphous, synthetic sodium aluminum silicate is reacted with a $Na_2O$ supplying compound.

SUMMARY OF THE INVENTION

The task of the invention is to provide a process for the production of a seed mixture for the synthesis of faujasite which can be produced industrially with good reproducibility in narrow limits of tolerance.

The subject matter of the invention is a process for the production of a seed mixture for the synthesis of faujasite which comprises diluting aqueous sodium hydroxide with water with stirring and heating to a temperature of 50° to 80° C., adding precipitated silica, cooling this mixture to a temperature of 30° to 70° C., adding aqueous sodium aluminate liquor and subsequently more water so that there is obtained a mixture having the composition $12\pm3$ $Na_2O:Al_2O_3:12\pm3$ $SiO_2:200\pm60$ $H_2O$ and subsequently this mixture is aged at $35°\pm5°$ C. for 18–72 hours.

As optimum range for the composition of a seed mixture there has proven suitable $Na_2O:Al_2O_3:SiO_2:H_2O = (11.5-13.5):1:(11.5-13.5):200$ ($Na_2O=SiO_2$). At an aging temperature of $35°\pm5°$ C. this seed mixture makes available after about 18–30 hours sufficient activity to guarantee a crystallization of Na-Y-zeolite in a maximum of 24 hours.

A storage temperature of 35° C. has proven advantageous for the seed mixtures of the invention which is produced from precipitated silica, sodium aluminate liquor and sodium hydroxide liquor.

The seed mixtures of the invention are inclined to gel after a certain time. Yet they remain handleable without problem if they are stored in a stirred container. A lowering of the seeding activity was not observable even after several months.

The sodium hydroxide liquor (soda lye) employed can have the following composition:

300–600 $Na_2O$ g/l

The sodium aluminate liquor employed can have the following composition:

$Al_2O_3 = 100$–200 g/l $Na_2O = 150$–300 g/l

The precipitated silica can be added as a powder and/or as a filter cake.

The process of the invention shows the following advantages.

The synthetic, amorphous precipitated silica employed as starting compound is always available of sufficient purity and is available in practically unlimited amounts. In the production of the seed mixture of the invention, the component $SiO_2$ is present in a fixed stoichiometric ratio in the precipitated silica. Dosing errors can be excluded since preferably for the adjustment of the mole ratio there are needed only dilute aqueous sodium hydroxide water and aqueous sodium aluminate.

The seed mixtures produced according to the invention surprisingly show scarcely no tendency to gel. They can be used for the synthesis of faujasite even after months, e.g. up to one year without recognizable changes.

With the seed mixture of the invention there can be produced faujasite of Type Y and of Type X, in which case known starting materials as well as known reaction mixtures can be used.

Especially there can be selected reaction conditions such as are described in German patent 1038016, German patent No. 1098929 and German AS 1203239, the entire disclosures of which are hereby incorporated by reference and relied upon. The seed mixture thereby can be added in amounts of 0.5 to 10 vol. %, preferably 2 to 3 vol. %, based on the synthesis mixture.

The process can comprise, consist essentially of or consist of the stated steps with the recited materials.

DETAILED DESCRIPTION

Example 1

The seed mixtures of the invention are produced according to the following directions.

306 ml of aqueous sodium hydroxide (50%) and 298 ml of water (50% of the amount of water needed) are present and heated to $T_1$. After addition of precipitated silica the mixture is allowed to cool to $T_2$ and there is added via a dropping funnel 107.0 ml of aqueous sodium aluminate (313 grams $Na_2O/l$, 262.4 grams $Al_2O_3/l$) and the remaining amount of water. The mixture obtained had the composition $Na_2O:Al_2O_3:SiO_2:H_2O = 12.5:1:12.5:200$.

The precipitated silica employed has the following physico-chemical properties:

| | | |
|---|---|---|
| Surface area according to BET (1) | m²/g | 170 |
| Avg. size of the primary particles | nm | 18 |
| Bulk density (2) | g/l | 240 |
| pH (3) | | 6.3 |
| Sieve residue according to Mocker 45 μm) (4) | % | 0.2 |
| Loss on drying (2h, 105° C.) (5) | % | 6 |
| Loss on calcining (2h, 1000° C.) (5,6) | % | 5 |
| $SiO_2$ (7) | % | 98 |
| $Na_2O$ (7) | % | 1 |
| $Fe_2O_3$ (7) | % | 0.03 |
| $SO_3$ (7) | % | 0.8 |

(1) According to DIN 66 131 (German Industrial Standard 66131).
(2) According to DIN 53 194 (not sieved), ISO 787/XI or JIS K 5101/18.
(3) According to DIN 53 200 (in 5% aqueous dispersion) ISO 787/XI, ASTM D 1208 as JIS K 5101/24.
(4) According to DIN 53 580, ISO 787/XVII or JIS K 5101/20.
(5) According to DIN 55 921, ASTM D 1208 as JIS K 5101/23.
(6) Based on the material dried 2 hours at 105° C..
(7) Based on the material calcined for 2 hours at 1000° C..
pH According to DIN 53 200.

The pH was ascertained electrometrically with a glass electrode and a pH meter. The pH of silica general is in the neutral range, that of silicates in the weakly alkaline range.

Sieve Residue (according to DIN 53580)

A characteristic value of the degree of fineness is the sieve residue. For the detection of the portions which are not dispersible or only dispersible with difficulty and occur in the smallest amounts in precipitated silica there is determined the sieve residue according to Mocker. In this process a silica suspension is flushed through the sieve with 4 bar water pressure. The sieve is subsequently dried and the sieve residue recovered. There can be used a 45 micrometer sieve which corresponds to 325 mesh (according to ASTM).

Surface Area according to BET (DIN 6613)

The surface area of the silicas and silicates is measured according to the BET method in m²/g.

The process depends on the absorption of gaseous nitrogen at the temperature of liquid nitrogen. The area meter method according to Haul and Dumbgen advantageously can be used. A calibration is required. It includes both the inner and outer surface areas.

Average Size of the Primary Particles

The average size of the primary particles can be determined electron microscopically. For this purpose there is determined the diameter of about 3,000–5,000 particles, whose arithmetic average is calculated. The individual primary particles present generally are not isolated but combined to aggregates and agglomerates. The "agglomerate" particle sizes of precipitated silicas and silicates depends on the grinding process.

Bulk Density (according to DIN 53194)

It is a matter of a measure of the powdered product. About 200 g of silica are tamped into the measuring cylinder having a bulk volume of 1,250 ml. From the weight and the volume there is calculated the bulk density and given in g/l.

Loss On Drying (according to DIN 55921)

The precipitated product contains a small portion of physically bound water. After drying for 2 hours in a drying cabinet at 105° C. the main amount of the physically bound water is removed.

Loss On Calcining (according to DIN 55921)

After calcining for 2 hours at 1000° C. there is also removed the chemically bound water in the form of silanol groups. The loss on calcining is determined on the material dried for 2 hours at 105° C.

The individual test conditions are set forth in the following TABLE I.

TABLE I

Seed mixture based on precipitated silica, sodium aluminate, aqueous sodium hydroxide. Composition $Na_2O:Al_2O_3:SiO_2:H_2O = 12.5:1:12.5:200$, crystallization temperature 98° C.

| EX. NO. | $T_1/T_2$ | CRYSTAL-LIZA-TION TIME (Hours) | AGING OF THE SEED MIXTURE (Days) | CYCLO-HEXANE ABSORP. |
|---|---|---|---|---|
| 1 | 60/60 | 20 | 3 | 21.8 |
| 2 | 60/40 | 20 | 3 | 22.3 |
| 3 | 60/20 | am(20 h) | 3 | — |
| 4 | 60/60 | 17 | 5 | 24.1 |
| 5 | 60/40 | 17 | 5 | 21.7 |
| 6 | 70/60 | 16 | 3 | 22.4 |
| 7 | 70/40 | 16 | 3 | 21.3 |
| 8 | 70/60 | 22 | 18 hrs | 21.3 |
| 9 | 70/40 | 22 | 18 hrs | 21.4 |
| *10 | 60/60 | 22 | 24 hrs | — |

*In preparation of the seed mixture there was present 100% of the amount of water.

EXAMPLE 2

With the seed mixture of the invention according to Example 1 No. 8 in Table I, there was produced a zeolite Y; thereby the following raw materials were employed:

| | |
|---|---|
| Aqueous sodium hydroxide 50% | $Na_2O$ = 593 g/l |
| | ρ = 1.53 g/ml |
| Aqueous Aluminate | ρ = 1.365 g/ml |
| | $Al_2O_3$ = 179.4 g/l |
| | $Na_2O$ = 233.9 g/l |
| Precipitated silica as in Example 1 having a somewhat higher moisture content | $SiO_2$ = 91.2% |

There were present in a 1 liter Quickfit flask (reflux condenser, inner thermometer, teflon crescent-shaped stirrer, dropping funnel) 753 ml of $H_2O$ and 48.9 ml of aqueous sodium hydroxide (50%) (temperature of mixing about 40° C.). There was added thereto in portions within 5 minutes 251 grams of precipitated silica (containing 91% $SiO_2$, balance water) and the mixture stirred until a homogeneous mixture was formed about 10 minutes). There were subsequently added via a dropping funnel within 20 minutes 180.7 ml of aqueous sodium aluminate (with vigorous stirring). After addition of 20 ml of seed mixture the mixture was heated to 98° C. The synthesis mixture had the composition: $Na_2O:Al_2O_3:SiO_2:H_2O = 3.4:1:95:140$.

After the end of the crystallization (about 16-24 hours) the mixture was filtered over a suction filer and washed with water (wash water pH 10), the filter cake was dried in the drying cabinet at 110° C.:

| Properties: Cell constants: 24.62-24.65 A |  |
|---|---|
| Cyclohexane adsorption: 22 ± 2 % |  |
| (20° C., p/po = 0.8) |  |
| typ. chemical analysis: |  |
| $Na_2O$ | 10.7% |
| $Al_2O_3$ | 16.56% |
| $SiO_2$ | 49.25% |
| $H_2O$ | 21.7% |
| $SiO_2/Al_2O_3$ | 5.06 |
| $Na_2O/Al_2O_3$ | 1.06 |

The entire disclosure of German priority application P3538416.6 is hereby relied upon.

It is claimed:

1. A process for the production of a seed mixture for the synthesis of faujasite comprising the steps of
   a) diluting aqueous sodium hydroxide with water to a solution of 300-600 grams of $Na_2O$ per liter of solution:
   b) heating the diluted aqueous sodium hydroxide to a temperature of 50° to 80° C. and maintaining that temperature while;
   c) adding precipitated silica to the diluted aqueous sodium hydroxide;
   d) allowing the aqueous sodium hydroxide/silica mixture obtained in step (c) to cool or maintaining a temperature of 30° to 70° C.;
   e) adding aqueous sodium aluminate liquor to the mixture obtained in step (d);
   f) aging the aqueous sodium hydroxide/silica/sodium aluminate mixture obtained in step (c) at 30°-40° C. for 18-72 hours;
   wherein the precipitated silica and sodium aluminate are added in amounts such that, after step (e), the mixture has a composition $Na_2O:Al_2O_3:SiO_2:H_2O$ equal to (9-15):(1):(9-15):140-260.

2. The process according to claim 1, wherein, after step (e), the mixture has a composition $Na_2O:Al_2O_3:SiO_2:H_2O$ equal to (11.5 to 13.5):(1):(11.5 to 13.5):(200) and the ratio $(Na_O):(SiO_2)$ equals 1:1.

* * * * *